US008515476B2

(12) United States Patent
Alex et al.

(10) Patent No.: US 8,515,476 B2
(45) Date of Patent: Aug. 20, 2013

(54) SUBSCRIBER STATION TRANSCEIVER ALLOCATION OF GROUPS OF SUBCARRIERS BETWEEN A PLURALITY OF TRANSCEIVER ANTENNAS

(75) Inventors: Sam P. Alex, Santa Clara, CA (US); Louay Jalloul, Santa Clara, CA (US); Robert Lorenz, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/526,100

(22) Filed: Jun. 18, 2012

(65) Prior Publication Data

US 2012/0257593 A1   Oct. 11, 2012

Related U.S. Application Data

(63) Continuation of application No. 12/567,217, filed on Sep. 25, 2009, now Pat. No. 8,204,527.

(60) Provisional application No. 61/194,846, filed on Oct. 1, 2008.

(51) Int. Cl.
*H04B 7/00* (2006.01)

(52) U.S. Cl.
USPC .......................................... 455/509; 455/450

(58) Field of Classification Search
USPC .............. 455/450, 509, 451, 452.1, 101, 103; 375/267
See application file for complete search history.

(56) References Cited

U.S. PATENT DOCUMENTS

| | | | | |
|---|---|---|---|---|
| 7,646,823 B2 * | 1/2010 | Gaikwad | ........................ | 375/267 |
| 7,693,228 B2 * | 4/2010 | Aldana et al. | ................. | 375/267 |
| 7,813,442 B2 * | 10/2010 | Gaikwad | ........................ | 375/267 |
| 8,204,527 B2 | 6/2012 | Alex et al. | | |

\* cited by examiner

*Primary Examiner* — Raymond Dean
(74) *Attorney, Agent, or Firm* — Sterne, Kessler, Goldstein & Fox PLLC (57) ABSTRACT

Embodiments for at least one method and apparatus of a subscriber station transceiver allocating and transmitting groups of subcarriers between a plurality of transceiver antennas are disclosed. One method includes the subscriber station transceiver receiving at least one downlink signal through each of the plurality of subscriber station antennas. The subscriber station transceiver characterizes a received signal of the at least one downlink signal over multiple subcarriers. The subscriber station transceiver allocates groups of subcarriers for uplink transmission through each of the plurality of subscriber antennas, wherein the allocation is based on the characterized received signal of the at least one downlink signal over multiple subcarriers.

21 Claims, 8 Drawing Sheets

SUBSCRIBER STATION TRANSCEIVER ALLOCATION OF GROUPS OF SUBCARRIERS BETWEEN A PLURALITY OF TRANSCEIVER ANTENNAS

RELATED APPLICATIONS

This application is a continuation of U.S. application Ser. No. 12/567,217, filed Sep. 25, 2009, which will issue as U.S. Pat. No. 8,204,527 on Jun. 19, 2012, which claims benefit to U.S. Provisional Application No. 61/,194,846, filed Oct. 1, 2008, all of which are hereby incorporated by reference in its entirety.

FIELD OF THE DESCRIBED EMBODIMENTS

The described embodiments relate generally to wireless communications. More particularly, the described embodiments relate to allocating groups of subcarriers between a plurality of antennas of a transceiver.

BACKGROUND

Wireless networks are gaining popularity because wireless infrastructures are typically easier and less expensive to deploy than wired networks. A popular wireless network implementation uses base stations that communicate with wireless user devices that are located within cells formed by the base stations.

The wireless user devices are commonly referred to as wireless subscriber stations. A wireless subscriber station commonly employs a single antenna. Configuring the subscriber station to have multiple antennas can be beneficial because intelligent multiple antenna transmission schemes (such as spatial multiplexing) can be utilized. However, transmission from multiple antennas may require adjustment of a phase between the transmission signals, which in some cases can be difficult to implement.

It is desirable to have a method of optimizing uplink transmission of subscriber station transceivers using multiple antennas.

SUMMARY

An embodiment includes a method of a subscriber station transceiver allocating and transmitting groups of subcarriers between a plurality of transceiver antennas. The method includes the subscriber station transceiver receiving at least one downlink signal through each of the plurality of subscriber station antennas. The subscriber station transceiver characterizes a received signal of the at least one downlink signal over multiple subcarriers. The subscriber station transceiver allocates groups of subcarriers for uplink transmission through each of the plurality of subscriber antennas, wherein the allocation is based on the characterized received signal of the at least one downlink signal over multiple subcarriers.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods and apparatuses of a subscriber station transceiver allocating and transmitting groups of subcarriers between a plurality of transceiver antennas. The allocation and transmission does not require control and/or adjustment of the phase between multiple transmission signals.

Figure 1:
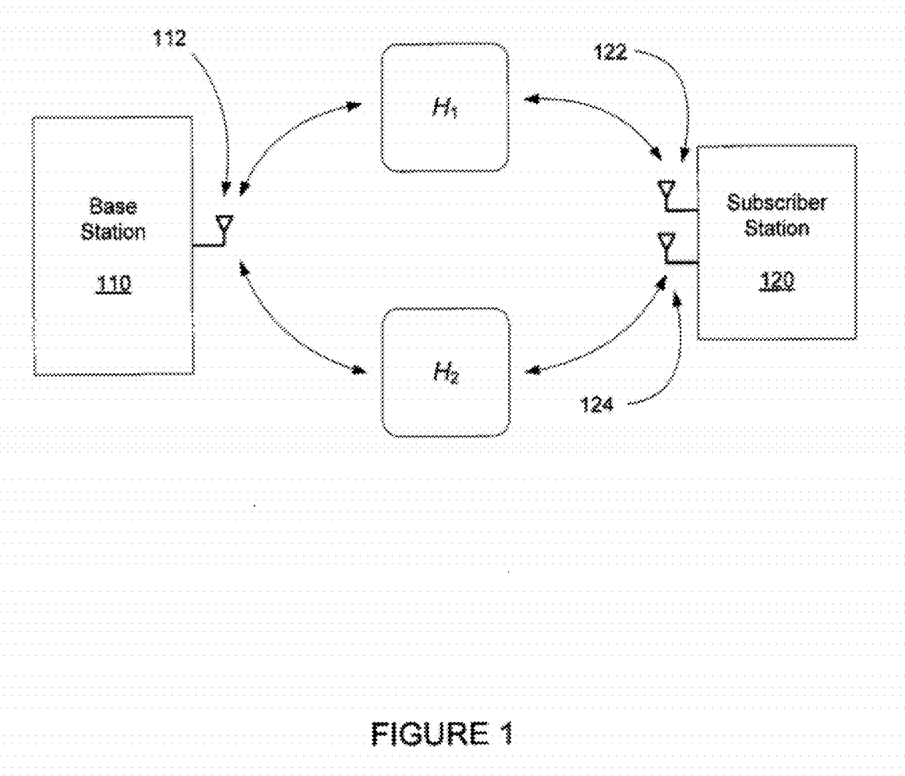
FIG. 1 shows an example of a base station and a subscriber station transceiver, wherein multiple propagation channels are formed between a base station antenna and each subscriber station antenna.

FIG. 1 shows an example of a base station 110 and a subscriber station transceiver 120, wherein multiple propagation channels $H_1$, $H_2$, are formed between each base station antenna 112 and each subscriber station antenna 122, 124. It is to be understood, however, the base station 110 can include multiple antennas, and the subscriber transceiver 120 can include more than two antennas.

A wireless communication signal traveling from the base station 110 to the subscriber station 120 is typically referred to as "downlink transmission", and a wireless communication signal traveling from the subscriber station 120 to the base station 110 is typically referred to as "uplink transmission". The transmissions can be included within a frame that includes a downlink sub-frame and an uplink subframe.

Some embodiments include the base station of the wireless system scheduling the wireless communication and the scheduling is communicated to subscriber stations through a control channel. The control channel can provide scheduling allocations, which for a multi-carrier system (such as an orthogonal frequency division multiplexing (OFDM)), designates sub-carriers and time intervals in which downlink and uplink transmissions between the base station and each mobile subscriber are to occur.

The control channel may be transmitted to the subscriber station within a downlink sub-frame. Embodiments of the downlink sub-frame may additionally include a preamble. The preamble can occur at the beginning of every frame. Embodiments of the preamble include pilot tones (generally referred to as pilots) being closely spaced across carriers of a multi-carrier signal. For example, one embodiment includes the pilots being occurring every third tone across the frequency spectrum of a multi-carrier signal. The pilots in the preamble can be transmitted at a higher power spectral density and contain modulation known to the receiver (subscriber station) as compared to data carrying subcarriers. These pilots can be used by communication systems to estimate the channel and/or to correct frequency and timing offsets.

For descriptive purposes, the down link channel as shown can be represented by:

$$H_{DL} = \begin{bmatrix} H_1 \\ H_2 \end{bmatrix}. \quad (1)$$

where $H_{DL}$ is the downlink (DL) propagation channel. The signal received by the SS can be given by:

$$y_{SS} = H_{DL} s_{DL} + n \in \mathbb{C}^2, \quad (2)$$

where $s_{DL}$ denotes the signal transmitted by the base station, $n \in \mathbb{C}^2$ is the additive noise plus interference, and $\mathbb{C}$ denotes the field of complex numbers. In practice, the downlink transmission is often transmitted from more than one antenna using a virtualizing scheme, such as, Cyclic Delay Diversity (CDD). In this case, the signals received by the subscriber appear to have been transmitted by a single virtual antenna.

The received uplink (UL) signal can be represented by $$y_{BS} = H_{UL} s_{UL} + \eta \in \mathbb{C}, \quad (3)$$

where $s_{UL} \in \mathbb{C}^2$ denotes the signal transmitted by the two antennas 122, 124 at the subscriber and $\eta \in \mathbb{C}$ denotes the additive noise present on the received UL signal.

For a time division duplex (TDD) system, the SS may exploit the reciprocity of the channel. More specifically:

$$H_{UL}(t) \cong H_{DL}^T (t+T), \quad (4)$$

provided $J_0(2\pi DT) \cong 1$, where D is the Doppler spread of the propagation channel, $J_0(\cdot)$ denotes the zero order Bessel function of the first kind, and T is the time duration between when the downlink channel was estimated and when the UL signal is transmitted.

One example of a communication system includes a WiMAX (Worldwide Interoperability for Microwave Access) system. WiMAX systems include multi-carrier, OFDM (Orthogonal frequency-division multiplexing) signals. A WiMAX transceiver may include a baseband digital signal processor which outputs two baseband signals (the described embodiments are not limited to two output baseband signals), possibly complex. These baseband output signals are up-converted in frequency and applied to two power amplifiers. The outputs of the power amplifiers are connected to two antennas (again, the described embodiments are not limited to two antennas) which are used for both transmit and receive. Each means for up-converting the baseband signals and amplifying them can be referred to as a transmit chain. The need for two transmit chains arises from the requirement to transmit a space-time block code or to transmit multiple spatial streams (spatial multiplexing). In WiMAX, the space time block code may be the Alamouti code, which is commonly referred to as Matrix A. In the same context, spatial multiplexing is commonly referred to as Matrix B.

In addition to transmitting Matrix A and Matrix B, it is attractive to exploit the available transmit power of both power amplifiers when transmitting a single spatial stream; hence, improving the quality of the uplink signal as received by the base station.

Consider, for example, a subscriber station in which an RF signal is applied to an RF signal is applied to a first antenna element and a phase-shifted version of the same RF signal is applied to a second antenna element. The resulting far-field radiation pattern depends on the geometry of the antenna elements and the phase shift of the signal applied to the second antenna element. If the relative phases of the signals at the two antennas are not carefully controlled, the benefit of transmitting the signal from a second antenna may not accrue; worse still, the signals may combine destructively. Hence, the method of transmitting the same RF signal from a plurality of antennas without controlling the relative phases of the applied RF signals is not attractive.

Two methods have been used to avoid this problem. The first, (cyclic delay diversity) CDD, applies a frequency dependent phase shift to avoid destructive cancellation of the signals across all frequencies. The second method, Tile Switching Diversity (TSD) varies transmit antennas, but does not make use of the relative strengths of the received signals for assignments of groups of subcarriers. Both CDD and TSD are suboptimal methods as they fail to exploit the subscriber station's knowledge of and the reciprocity of the channel.

It is desirable to use the available power from two power amplifiers in the two transmit chains without controlling the phase of the signals applied to each of the antennas. It is also desirable to exploit the subscriber stations knowledge of the UL channel.

In the embodiment disclosed, the subscriber transmits constituent spectral components of an UL signal from one of the two available antennas. Therefore, the transmitted spectral components are non-overlapping between the antennas. This precludes the problems associated with transmitting a common RF signal from two antennas without controlling the phases. These spectral components are grouped into blocks of subcarriers.

The available output power of the power amplifiers (PAs) may constrain the number of subcarriers that can be transmitted at a desired power spectral density. Embodiments include assigning groups of subcarriers for transmission from each antenna to maximize a UL link quality, subject to the power constraints of the power amplifiers (PAs). The objective of maximizing the UL link quality is based on maximizing an objective function of the expected UL channel. A recently estimated DL channel can be used as a proxy for the UL channel in an upcoming UL transmission. This downlink channel estimate may be formed, for example, from the preamble of a frame of the downlink signal. Alternatively and/or additionally, the downlink channel estimate can be derived based on pilots that occur after the preamble in the DL subframe.

Embodiments include transmitting the UL signal transmissions on exactly one of the UL antennas to maximize capacity or its proxy SNR, subject to the power constraints of the PAs.

At the BS, the receive signal processing includes estimating the UL channel. This channel estimation commonly averages the pilots of a group of adjacent subcarriers for the purpose of reducing the effects of additive noise and interference. In general, the channels from the subscriber station antennas to the BS antennas are different in both amplitude and phase. To preclude introducing channel estimation errors due to averaging at the base station, embodiments include avoiding the separation of tiles across subscriber antennas. For the WiMAX system, a useful grouping of subcarriers includes, for example, PUSC UL tiles, wherein PUSC refers to the Partial Usage of Subchannels.

It is advantageous to assign groups of subcarriers on a tile-by-tile basis for two reasons. First, the UL tiles span a narrow range of frequencies. Therefore, the channel typically varies by only a small amount across the tile and the channel for all subcarriers within this group can be effectively characterized by a single metric.

Second, the collection of tiles that make up a subchannel do not change during the UL subframe. This allows us to assign tiles to individual antennas without concern that subsequent assignment, on subsequent symbols, may result in the same tile being transmitted on different antennas on different symbols. This is true even in the case of, for example, subchannel rotation in, WiMAX systems. Subchannel rotation is described in section 8.4.6.2.6 of the IEEE 802.16 standard.

Other useful grouping of subcarriers include the Band AMC bin in the WiMAX standard and the Physical Resource Block (PRB) in the 3rd Generation Partnership Program Long-Term-Evolution (LTE) standard.

Figure 2:
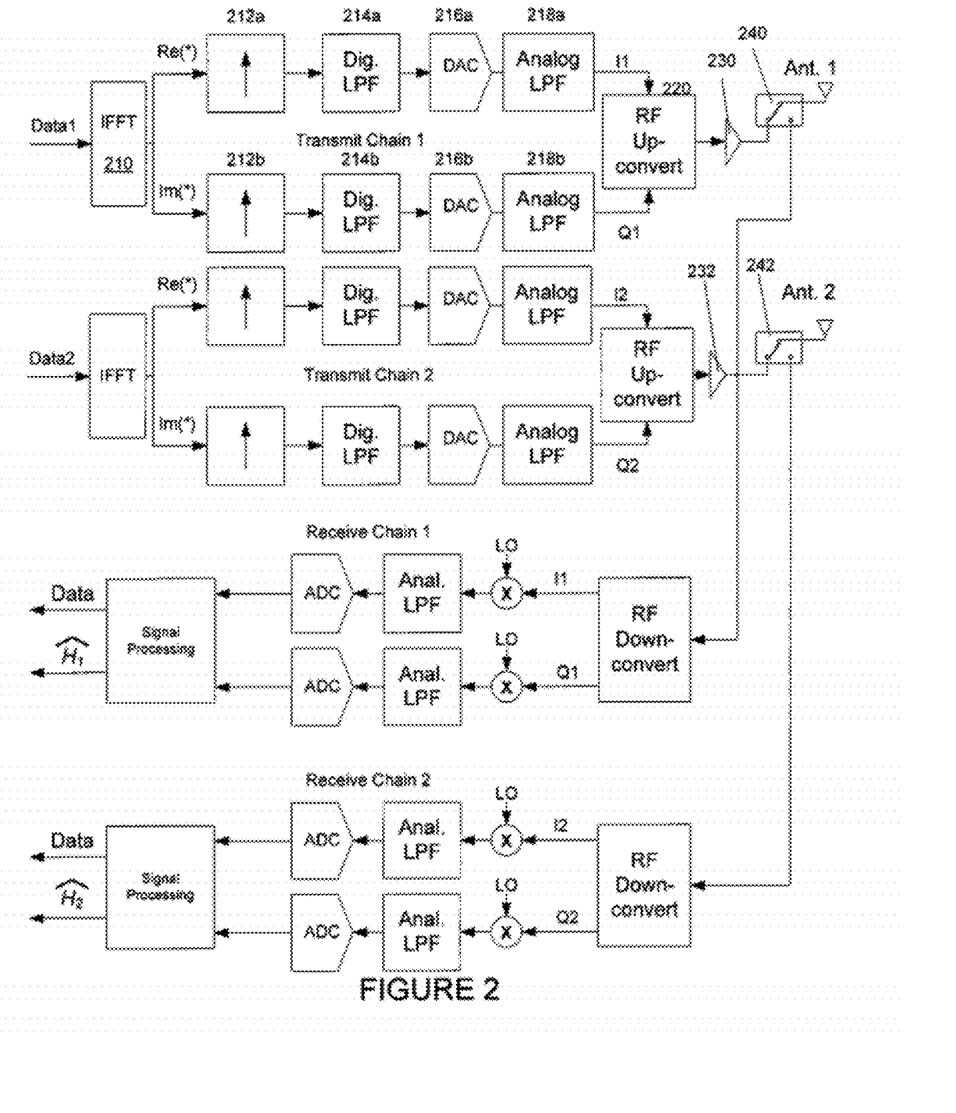
FIG. 2 shows an example of a block diagram of subscriber station transceiver employing multiple antennas.

FIG. 2 shows block diagrams of an example of radio frequency (RF) transmission chains associated with each antenna of the subscriber station transceiver. For this example, of the transmitter component of an OFDM transmitter used in a mobile station (MS). The symbol data (for example, Data1 which processed through a transmitter chain 1 before transmission from the first antenna Ant. 1) is applied an input IFFT circuit 210 which implements an inverse Fast-Fourier transform (IFFT). The real and imaginary (I, Q) components of the IFFT outputs are upsampled by upsamplers 212a and 212b, which interdigitate zeros between the samples of the IFFT output. The upsampled signals are passed through digital lowpass filters 214a, 214b, digital-to-analog converters (DACs) 216a, 216b, analog lowpass filters 218a, 218b, before being frequency upconverted and combined by an RF upconverter 220. The frequency upconverted signal is amplified by a power amplifier 230 and transmitted from the first antenna Ant. 1. The other transmit chain (transmit chain 2) includes similar functional blocks as the first transmit chain (transmit chain 1), including a power amplifier 232.

Switches 240, 242 generally provide switches connections between the two antennas Ant. 1, Ant. 2 and the transmit chains 1, 2 and the receiver chains 1, 2.

The receive chains (receive chain 1, receive chain 2) include RF frequency downconverters, frequency translators, analog lowpass filters, analog to digital converters (ADCs) and signal processors. The receive chains generate received baseband signals, and with signal processing, generate Data, and the channel estimates (for example, vectors $\hat{H}_1$ and $\hat{H}_2$).

Figure 3:
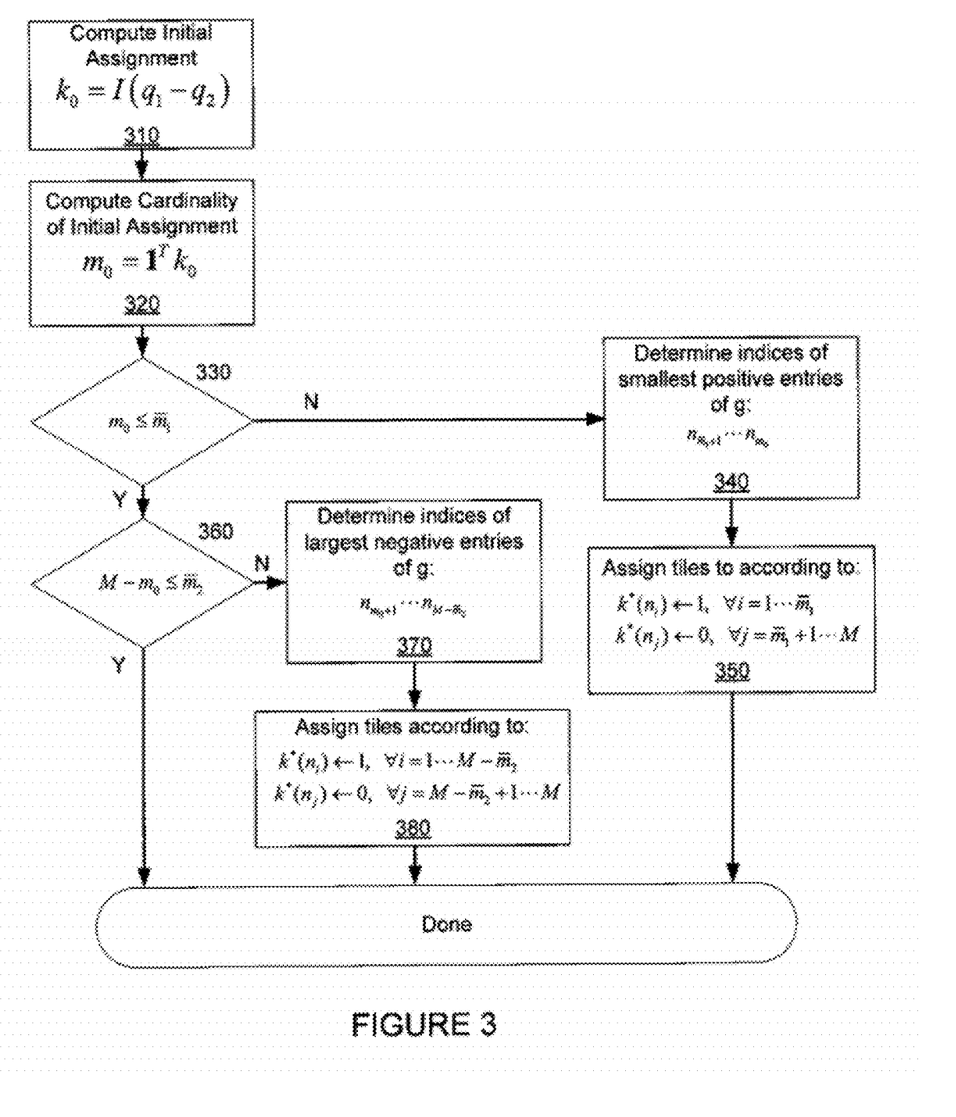
FIG. 3 shows a flow chart that includes steps of an example of a method for assigning groups of adjacent subcarriers to each of a plurality of antennas.

FIG. 3 shows a flow chart that includes steps of an example of a method for assigning groups of adjacent subcarriers to each of a plurality of antennas. Mutually exclusive assignments (allocations) of groups of subcarriers can be made to preclude the additional directivity associated with transmitting a signal component from a first antenna and a potentially phase shifted version of the signal component from a second antenna. Let $f \in \mathbb{R}^M$ denote the center frequencies of the groups of subcarriers to be transmitted on the uplink, where $\mathbb{R}$ denotes the field of real numbers. Let $\underline{H}_1 \in \mathbb{C}^M$ and $\underline{\hat{H}}_2 \in \mathbb{C}^M$ be the vectors of estimated values of received DL channels at the subscriber station antennas 1 and 2, respectively, where $\underline{H}_1(i)=\hat{H}_1(f(i))$ and $\underline{\hat{H}}_2(i)=\hat{H}^2(f(i))$. Let $q_1:\mathbb{C}^M \rightarrow \mathbb{R}^M$ and $q_2: \mathbb{C}^M \rightarrow \mathbb{R}^M$ be real, vector valued functions of the received downlink channel measurements at frequencies $f(1) \ldots f(M)$. Functions $q_1(\cdot)$ and $q_2(\cdot)$ correspond to expected utility of transmitting the groups of subcarriers on antennas 1 and 2, respectively.

Let $Q:\mathbb{R}^M \times \mathbb{R}^M \times \{0,1\}^M \rightarrow \mathbb{R}$ denote the functional $$Q(\underline{H}_1,\underline{H}_2,k)=k^T q_1(\underline{H}_1)+(1^T-k)q_2(\underline{H}_2), \quad (5)$$

where $k \in \{0,1\}^M$ denotes a vector of binary decisions, 1 denotes an M dimensional (column) vector of ones, and $(\cdot)^T$ denotes transpose. Here, elements of k define the decisions for allocating the corresponding groups of subcarriers to antennas 1 and 2. A value of 1 indicates that the corresponding group of subcarriers is assigned to antenna 1; a value of 0 indicates assignment to antenna 2.

It is desirable to transmit the various UL times on exactly one of the UL antennas (Ant. 1, Ant. 2) to maximize the overall utility function, as shown in Equation (5), subject to the per-antenna power constraint.

A useful choice for functions $q_1(\cdot)$ and $q_1(\cdot)$ are the received downlink signal powers estimated at the frequencies at which the groups of UL subcarriers are to be transmitted. That is, by:

$$q_1=|\underline{H}_1|^2 \in \{\mathbb{R}^+\}^M \quad (6)$$

and $$q_2=|\underline{H}_2|^2 \in \{\mathbb{R}^+\}^M, \quad (7)$$

Another choice for functions $q_1(\cdot)$ and $q_1(\cdot)$ are given by the expected capacities of the UL channels, viz., $$q_1 = \log_2\left(1 + \frac{|H_1|^2}{\sigma_1^2}\right) \in \{\mathbb{R}^+\}^M. \quad (8)$$

and $$q_2 = \log_2\left(1 + \frac{|H_2|^2}{\sigma_2^2}\right) \in \{\mathbb{R}^+\}^M, \quad (9)$$

where $\sigma 1$ and $\sigma_2$ denote the, potentially unknown, noise plus interference at the base station. For $\sigma_1=\sigma_2$, the capacity metrics in (8) and (9) are well approximated by the signal power metric in (6) and (7) as $\log_2(1+x) \cong \log_2(e) \cdot x$ for x small. The use of signal strength affords the additional benefit of reduced computational complexity. Yet another choice for functions $q_1(\cdot)$ and $q_1(\cdot)$ is given by $$q_1=(|\underline{H}_1|^2+|\underline{H}_2|^2)\circ I(|\underline{H}_1|^2-|\underline{H}_2|^2) \in \{\mathbb{R}^+\}^M. \quad (10)$$

and $$q_2=(|\underline{H}_1|^2+|\underline{H}_2|^2)\circ I(|\underline{H}_2|^2-|\underline{H}_1|^2) \in \{\mathbb{R}^+\}^M, \quad (11)$$

where $\circ$ denotes the Hadamard or element-wise product and $I(\cdot):\mathbb{R}^M \rightarrow \{0,1\}^M$ is a vector valued indicator function with for which $$I_k(x) = \begin{cases} 1 & x_k \geq 0 \\ 0 & \text{else,} \end{cases} \quad (12)$$

where $x \in \mathbb{R}^M$ and $x_k$ denotes the $k^{th}$ element of x. This choice of functions corresponds to a binary decision weighted by sum of the signal powers received by the two antennas. The gradient of the objective function Q in equation (5) is given by:

$$g = \frac{\partial Q}{\partial k} = q_1 - q_2 \in \mathbb{R}^M. \quad (13)$$

Power amplifiers typically have a maximum rated output power, beyond which, they distort causing out-of-band emissions or an increase in error vector magnitude (EVM). When transmitting at maximum, or near maximum power, this may constrain the maximum number of groups of subcarriers that can be transmitted from a single antenna. Let $\overline{m}_1$ and $\overline{m}_2$ denote the maximum number of groups of subcarrier can be transmitted from antenna 1 and antenna 2, respectively. Additionally, it can be assumed that each group of subcarriers must be transmitted from at least one of the antennas. Therefore, the assignment of the groups of subcarriers can be viewed as be following optimization problem:

$$Q^* = \max_{k \in \{0,1\}^M} k^T q_1 - (1^T - k) q_2 \quad \text{s.t.} \quad M - \overline{m}_2 \leq 1^T k \leq \overline{m}_1, \quad (14)$$

The affine dependence of the objective may be used to efficiently solve for the optimal decision vector k*, where $$k^* = \arg\max_{k \in \{0,1\}^M} k^T q_1 - (1^T - k) q_2 \quad \text{s.t.} \quad M - \overline{m}_2 \leq 1^T k \leq \overline{m}_1, \quad (15)$$

Given a strictly feasible constraints $\overline{m}_1$ and $\overline{m}_2$ with $\overline{m}_1 + \overline{m}_2 \leq M$ and a gradient of the objective function, $g \in \mathbb{R}^M$, we can solve for the vector of optimal assignments $k \in \{0,1\}^M$ using an algorithm, for example, as shown in FIG. 3. For the purpose of explaining the algorithm, consider that creation of a sequence of indices $n=[n_1 \ldots n_M]$ such that with $s(i)=g(n_i)$ with $s(i) \geq s(i+1) \forall i \in [1, M-1]$. This sequence could be obtained by sorting the elements of g in descending order. The full sorting of g is not necessary as shown below.

A step 310, of FIG. 3, includes forming an initial assignment $$k_0 = I(g) \in \{0,1\}^M, \quad (16)$$

where $I(\cdot) \in \{0,1\}^M$ is as defined in (12).

A Step 320 includes computing cardinality of initial assignments according to $m_0 = 1^T k_0$.

A Step 330 evaluating a sum constraint $$m_0 \leq \overline{m}_1. \quad (20)$$

If the constraint is met, go to step 360; otherwise, determine the $m_0 - \overline{m}_1$ indices smallest entries of g having a non-negative sign as described in Step 340. Denote these indices as $n_{\overline{m}_1+1} \ldots n_{m_0}$. Note that that determination of these indices requires less computational effort than a full sorting of the gradient vector g. The interpretation is to identify the indices that allow meeting the sum constraint in (20) with minimal effect to the objective function. The gradients as defined in (13) give the sensitivity of the objective function (5) to modification of the elements of $k_0$. These sensitivities correspond to Lagrange multipliers or the shadow prices associated with the per-PA power constraint.

A Step 350 includes assigning the groups of subcarriers according to the decision vector k*, with $k^*(n_i) \leftarrow 1, \forall i=1 \ldots \overline{m}_i$ and $k^*(n_j) \leftarrow 0, \forall j=\overline{m}_1+1 \ldots M$.

A Step 360 includes evaluating a sum constraint $$M - m_0 \leq \overline{m}_2. \quad (17)$$

If constraint is met, the initial assignment of $k_0$ is optimal and $k^* \leftarrow k_0$. Otherwise, a Step 370 includes determining the $M - m_0 - \overline{m}_2$ indices of the negative entries of g having the smallest absolute value as described in Step 340. These indices can be denoted as $n_{m_0+1} \ldots n_{M-\overline{m}_2}$. As before, determining these indices requires less computational complexity than the complete sorting of the gradient vector g.

A Step 380 includes assigning the groups of subcarriers according to the decision vector k*, with $k^*(n_i) \leftarrow 1, \forall i=1 \ldots M-\overline{m}_2$ and $k^*(n_j) \leftarrow 0, \forall j=M-\overline{m}_2+1 \ldots M$.

If the power amplifiers associated with antenna 1 and antenna 2 are capable of producing the same output power, the maximum number of tiles to transmit from each antenna is the same; that is, $\overline{m}_1 = \overline{m}_2$.

The example of FIG. 3 corresponds to a method for assigning groups of adjacent subcarriers based on downlink channel quality metrics subject to meeting transmit power constraints of the subscriber station transceiver.

Figure 4A:
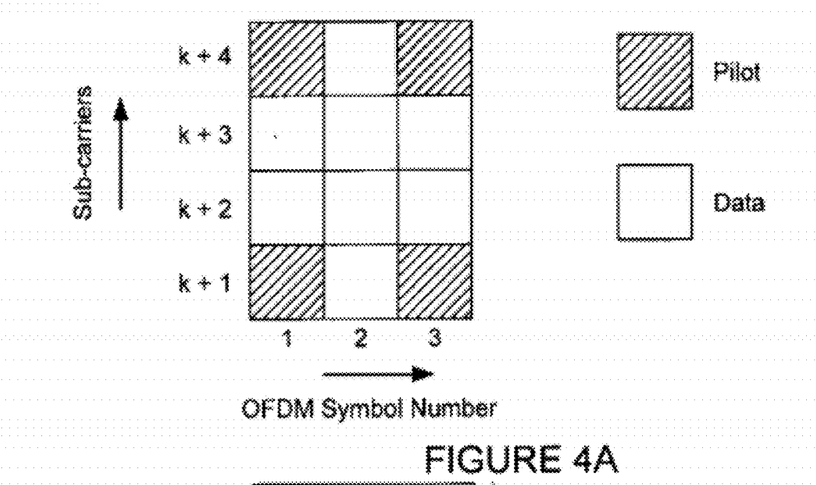
FIG. 4A shows an example of a group of subcarriers that includes pilot subcarriers and data subcarriers over multiple multi-carrier symbols.

FIG. 4A shows an example of a group of subcarriers (for example a WiMAX PUSC-tile) that includes pilot subcarriers and data subcarriers over multiple multi-carrier symbols. The PUSC-tile of FIG. 4A includes subcarriers that are defined by subcarriers locations k+1, k+2, k+3, k+4 and by OFDM symbol numbers 1, 2, 3. The tile shown includes pilots at the corners of the tile, and data subcarriers in the remaining locations.

Figure 4B:
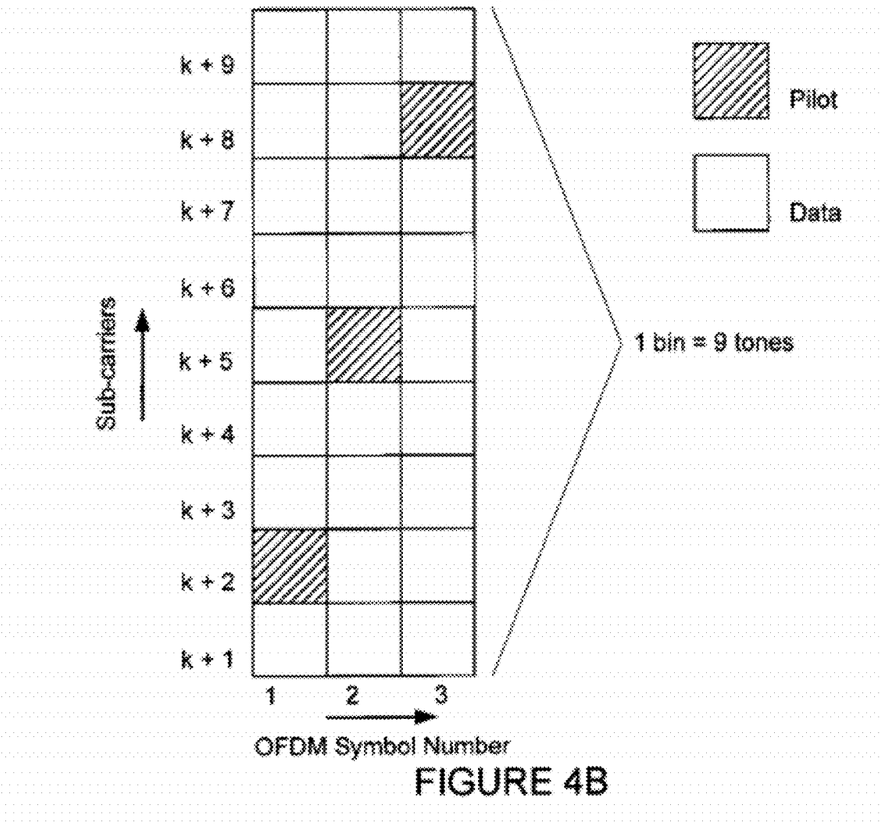
FIG. 4B shows another example of a group of subcarriers that includes pilot subcarriers and data subcarriers over multiple multi-carrier symbols.

FIG. 4B shows another example of a group of subcarriers that includes pilot subcarriers and data subcarriers over multiple multi-carrier symbols. This embodiment is consistent with Band_AMC of the WiMAX standard.

Figure 5:
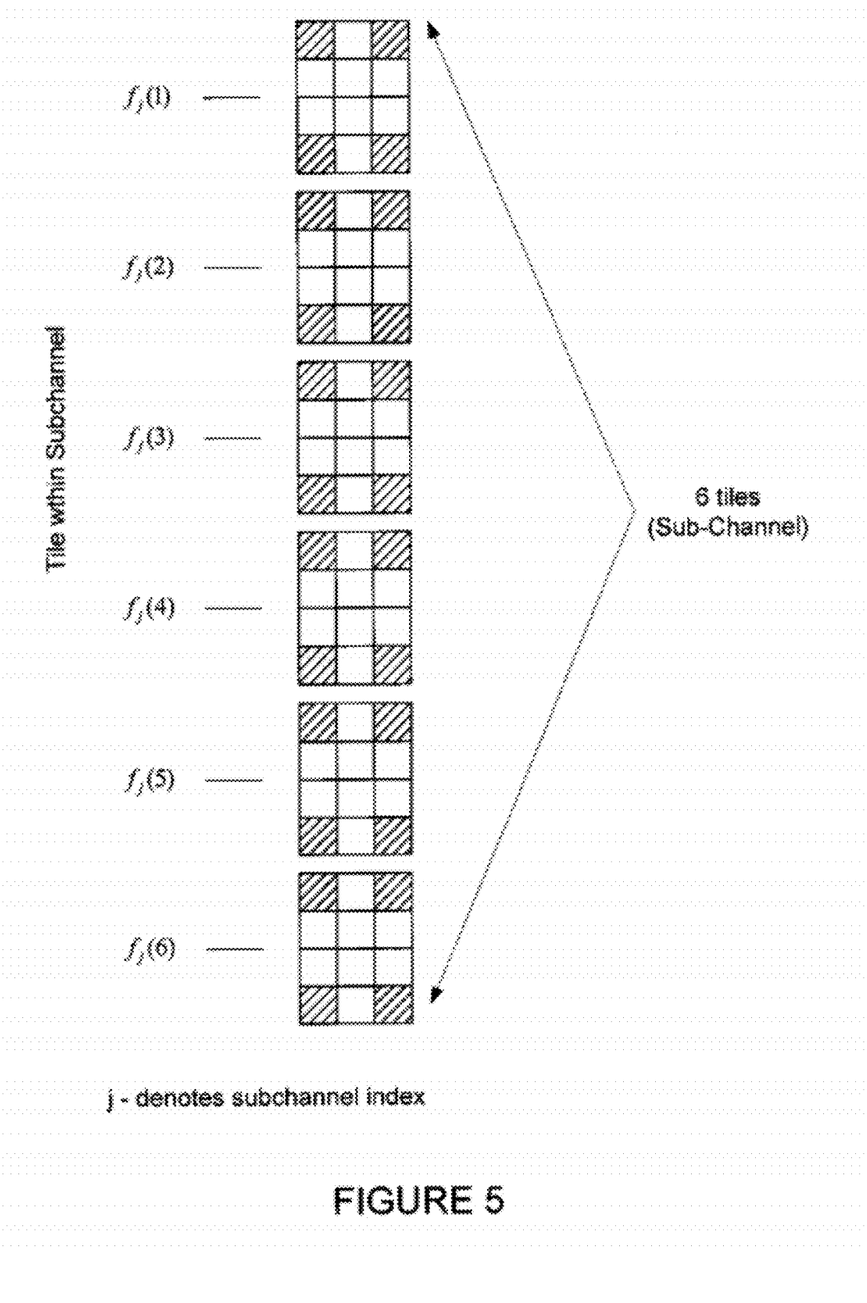
FIG. 5 shows an example of six groups of subcarriers over multiple symbols.

FIG. 5 shows an example of a subchannel that includes six groups of subcarriers over multiple symbols. Each of the tiles includes pilot and data subcarriers which are the same as the tile shown in FIG. 4A. For at least some embodiments, the six tiles constitute a subchannel. The six tiles of the subchannel have been labeled $f_j(1), f_j(2), f_j(3), f_j(4), f_j(5), f_j(6)$. Here, j denotes the subchannel index.

Figure 6:
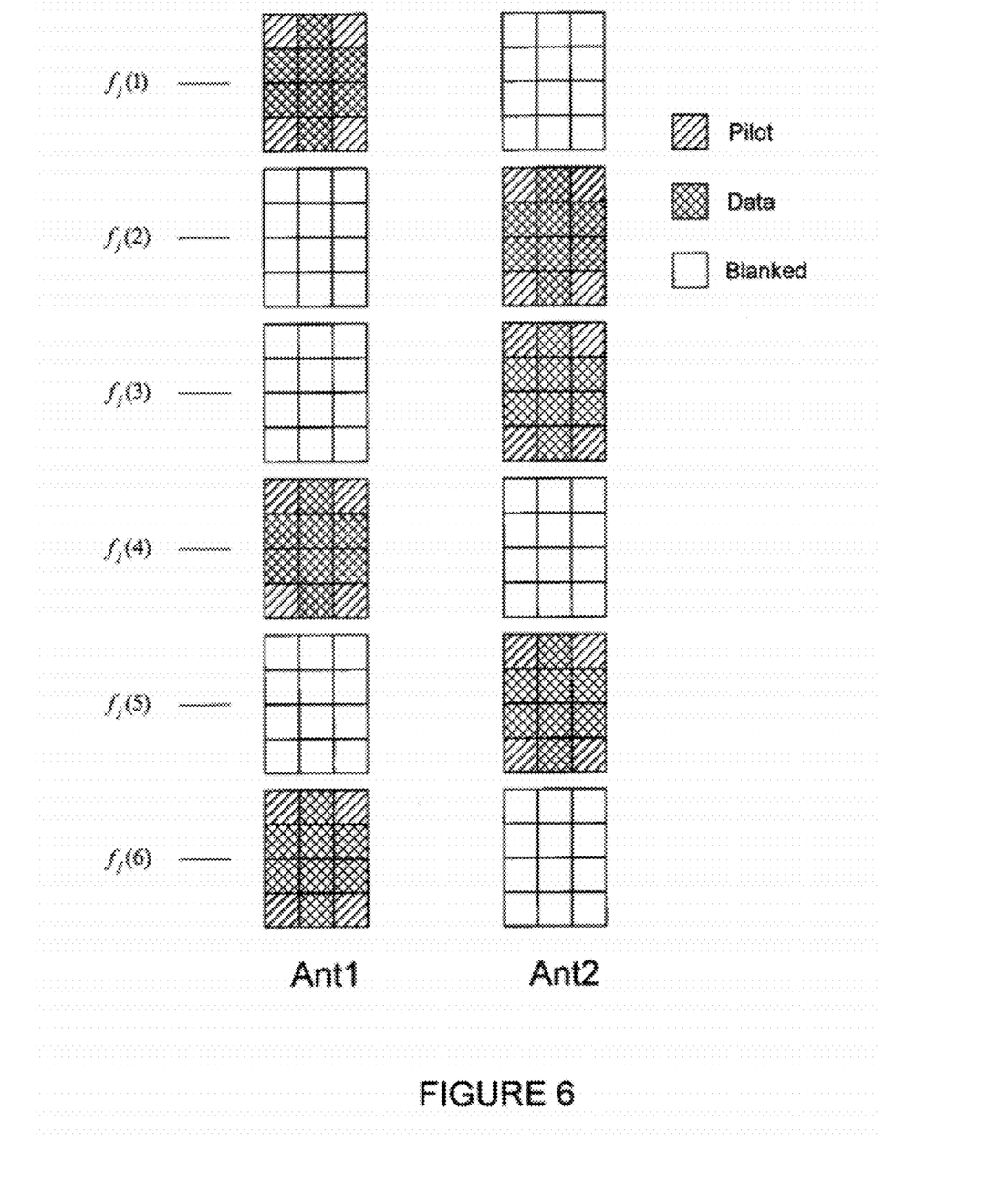
FIG. 6 shows an example of groups of subcarriers that have been allocated between two subscriber station antennas.

FIG. 6 shows an example of tiles (groups of subcarriers) that have been allocated between two separate subscriber station transmit antennas. As shown, each antenna (Ant. 1, Ant. 2) have been allocated three out of a possible six tiles. Also as shown, none of the allocated tiles of one antenna overlap in frequency with the allocated tiles of the other antenna. That is, tiles $f_j(1), f_j(4), f_j(6)$ have been allocated to the antenna Ant. 1 and tiles $f_j(2), f_j(3), f_j(5)$ have been allocated to the other antenna Ant. 2. All of the tiles are allocated to a single antenna. Any of the described embodiments can be used for making the tile allocations between the two antennas. As previously described, the allocations can be over more than two antennas, and can include any number of tiles.

Figure 7:
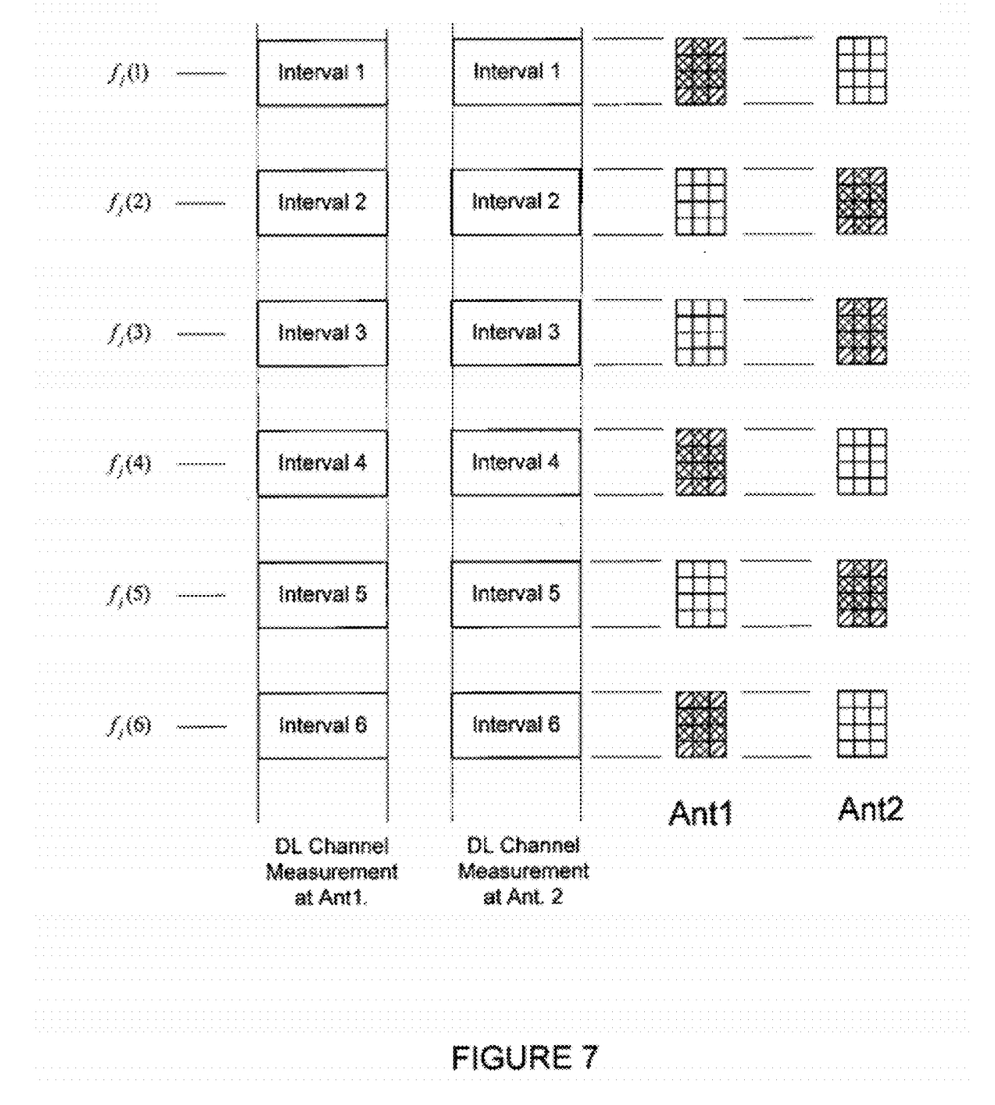
FIG. 7 shows an example of measurements taken over a range of frequencies of the downlink signals, and the corresponding allocating of groups of subcarriers between two subscriber station antennas, based on the measurements.

FIG. 7 shows an example of channel measurements taken over a range of frequencies of the downlink signals, and the corresponding allocating of groups of subcarriers (tiles) between two separate subscriber station antennas, based on the channel measurements. That is, channel measurements are made at both antennas (Ant. 1, Ant. 2) before the allocating the tiles to the antennas. The measurements can be made, for example, during a preamble of a downlink sub-frame. As shown, the measurements are made over each of six intervals (Interval1, Interval2, Interval3, Interval4, Interval5, Interval6) on both of the antennas. Based on the measurements, the groups of subcarriers (tiles) are allocated between the two antennas (Ant. 1, Ant. 2). As shown, none of the allocated tiles of one antenna overlap in frequency with the allocated tiles of the other antenna. As shown in FIG. 7, the measurements of the DL channel can be made over intervals in frequency that correspond to the frequencies of the tiles to be allocated for UL transmission. An embodiment includes measuring the DL channel over an interval in frequency that overlaps the frequencies of the tiles to be allocated for UL transmission. Another embodiment includes measuring the DL channel at a frequency in the interval of the frequencies of the tiles to be allocated for UL transmission. An alternate embodiment includes measuring the DL channel at a plurality of frequencies and making the allocation of tiles for UL transmission based on these measurements.

Figure 8:
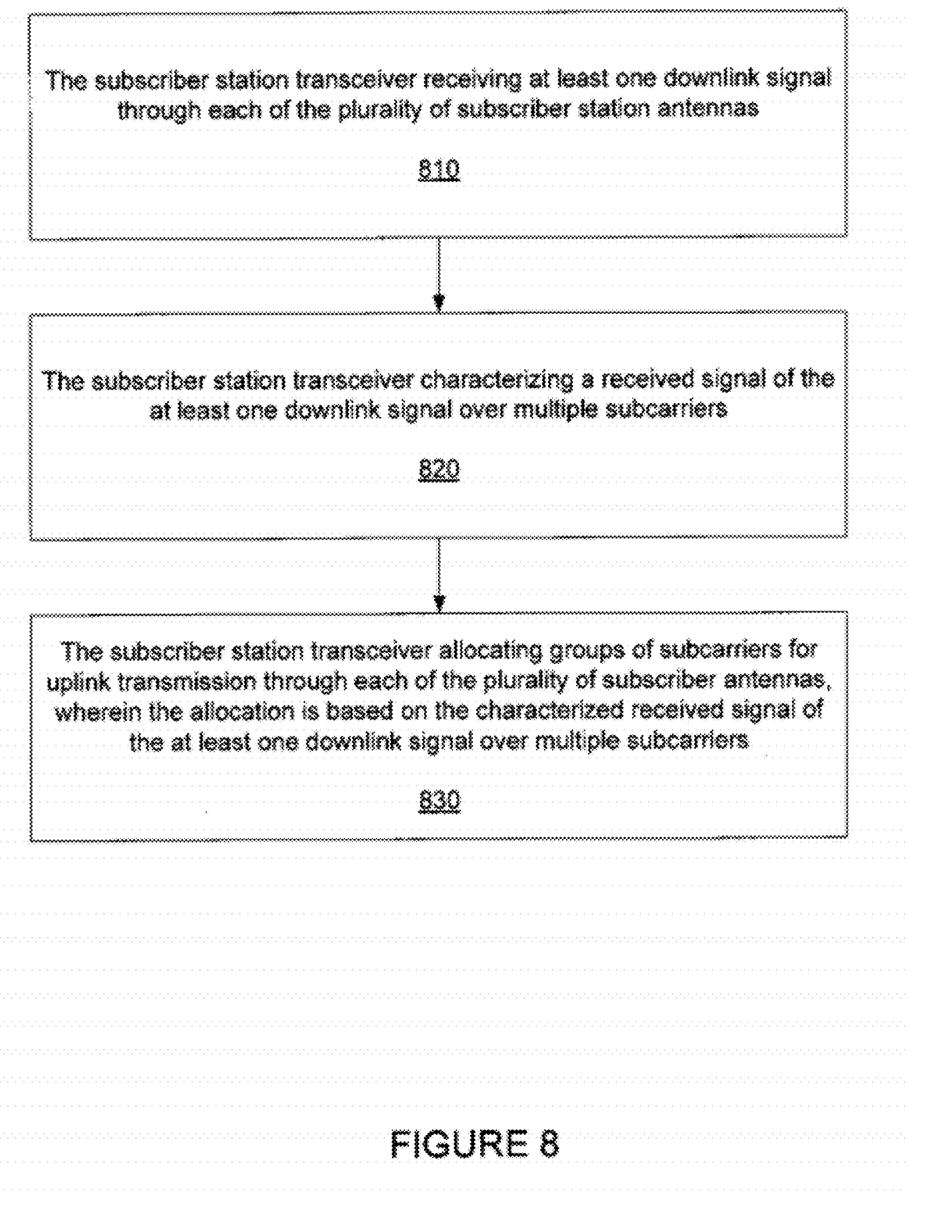
FIG. 8 shows a flow chart of steps of an example of a method of a subscriber station transceiver allocating and transmitting groups of subcarriers between a plurality of transceiver antennas.

FIG. 8 shows a flow chart of steps of an example of a method of a subscriber station transceiver allocating and transmitting groups of subcarriers between a plurality of transceiver antennas. A first step 810 includes the subscriber station transceiver receiving at least one downlink signal through each of the plurality of subscriber station antennas. A second step 820 includes the subscriber station transceiver characterizing a received signal of the at least one downlink signal over multiple subcarriers. A third step 830 includes the subscriber station transceiver allocating groups of subcarriers for uplink transmission through each of the plurality of subscriber antennas, wherein the allocation is based on the characterized received signal of the at least one downlink signal over multiple subcarriers.

An embodiment includes the subscriber station characterizing the receive signal based on a received signal power. Further, the groups of subcarriers are allocated based on the received signal power. For example, characterizing the received downlink signals can include determining a relative signal power difference between multiple subcarrier signals received through each of the plurality of subscriber antennas. The received signal power for each antenna of the subscriber station can be determined by measurement at the subscriber station.

An embodiment includes allocating the groups of subcarriers for uplink transmission through each of the plurality of subscriber antennas based on an expected uplink channel quality as estimated based on the characterized received signals of the at least one downlink signal over subcarriers. For one embodiment, the expected uplink channel quality is based on at least one of an expected uplink capacity, an expected uplink signal-to-noise ratio (SNR), an expected uplink signal-to-interference and noise (SINR), expected uplink total received signal power. For another embodiment, the expected uplink channel quality is based on at least one of an estimated downlink capacity, an estimated downlink received signal power.

The SNR can be estimated at the subscriber station using knowledge of the preamble and/or pilot subcarriers. The estimated SNR can be used to estimate the expected capacity C, using the relationship $C=\log_2(1+SNR)$.

Another embodiment includes allocating groups of subcarriers based on at least one of a sum of receive signal powers across the plurality of subscriber station antennas, a sum signal-to-noise ratios across the plurality of subscriber antennas, a weighted sum of signal-to-noise ratios across the plurality of subscriber antennas. The weighting can be dependent on a long term average received signal power, and/or results from a factory calibration.

Another embodiment includes the subscriber station transceiver characterizing the received downlink signals based on subcarriers corresponding to the groups of subcarriers to be transmitted on the uplink. That is, the groups of subcarriers (for example, tiles) may have been designated, for example, by a base station. The base station designation can include the designation of specific multi-carrier subcarriers. This embodiment includes the characterizing of the received downlink signals based on subcarriers occurring on the same corresponding groups of subcarriers (tiles) as designated by the base station.

For another embodiment, the subscriber station transceiver characterizing a received signal power of the at least one downlink signal over multiple subcarriers includes characterizing pilot tones of a preamble of a downlink sub-frame of the at least one downlink signal. For example, the subscriber station transceiver characterizes the DL channel, using pilot tones of the preamble, corresponding to the group of subcarriers to be allocated on the uplink. Alternatively the subscriber characterizes the received signal of the at least one downlink signal over at least one subcarrier that occur over a range of subcarriers that overlap the group of subcarriers to be allocated on the uplink. Alternatively, the subscriber characterizes the received signal of the at least one downlink signal that includes at least one subcarrier that occurs within the range of subcarriers as the group of subcarriers to be allocated on the uplink. Alternately, the subscriber characterizes the received signal of the at least one downlink signal over at least one subcarrier that occur over a range of subcarriers that overlap the group of subcarriers to be allocated on the uplink. Alternatively, the subscriber characterizes the received signal of the at least one downlink signal at a plurality of frequencies. Additionally, or alternatively, pilots that are not within the preamble can be characterized.

An embodiment includes the subscriber characterizing the downlink received signals over a plurality of frames. For example, the downlink receive signals are characterized during the preamble of several successive downlink sub-frames. The averaging is done to reduce the impact of estimation error on the characterization of the downlink received signals.

An embodiment includes allocating groups of subcarriers for uplink transmission through each of the plurality of subscriber antennas by sorting a difference of vector of downlink channel quality metrics from the plurality of subscriber station antennas. A more specific embodiment includes performing initial allocations based on the sorted difference vector of downlink channel quality metrics, determining a number of groups of subcarriers allocated to each subscriber antenna, and modifying the initial allocations of groups of subcarriers to meet transmit power constraints of the subscriber station transceiver while causing minimal change to the expected UL quality metric.

An embodiment includes allocating groups of subcarriers for uplink transmission through each of the plurality of subscriber antennas by sorting of a gradient of a downlink channel quality figure of merit (gradient of Q) based on the received downlink signals.

Another embodiment includes the subscriber characterizing the received signal power of the downlink signals over multiple subcarriers by filtering the downlink channel estimates to reduce the impact of channel estimation errors.

Another embodiment includes allocating groups of subcarriers within at least one sub-channel of multiple sub-channels. The allocation based on a sub-channel is done to reduce the computational complexity of the allocation process at the subscriber station. An embodiment includes allocating groups of subcarriers such that the allocations of the tiles to antennas are maintained for a time interval greater than the minimum time interval of the groups of allocated subcarriers during an UL transmission. A WiMAX PUSC-tile is an example of a group of subcarrier; the minimum time allocation for a PUSC-tile corresponds to 3 OFDM symbol periods. For an embodiment, the UL transmission occurs in a UL subframe. The maintaining of the allocations of the tiles to antennas during the UL transmission precludes introducing channel estimation errors due to averaging at the base station over time intervals greater than the minimum time interval of the groups of allocated subcarriers during an UL transmission.

For embodiment, the groups of subcarriers are defined by WiMAX Band Adaptive Modulation and Coding (BAMC) bins. Other embodiments include the groups of subcarriers being defined by a 3GPP ($3^{rd}$ Generation Partnership Program)-LTE (Long Term Evolution) physical resource blocks.

Although specific embodiments have been described and illustrated, the embodiments are not to be limited to the specific fauns or arrangements of parts so described and illustrated.

What is claimed:

1. A method of allocating and transmitting groups of subcarriers between a plurality of transceiver antennas, the method comprising:
    receiving a downlink signal through the plurality of transceiver antennas;
    characterizing, based on the downlink signal, a downlink channel over multiple subcarriers;
    determining, based on the characterized downlink channel and available output power of the transceiver antennas, groups of subcarriers for transmission; and
    allocating the groups of subcarriers for uplink transmission through the plurality of transceiver antennas.

2. The method of claim 1, wherein characterizing the downlink channel comprises characterizing the downlink channel based on determining a relative signal power difference between multiple subcarrier signals in the downlink signal, and wherein allocating the groups of subcarriers comprises allocating the groups of subcarriers based on the relative signal power difference.

3. The method of claim 1, wherein determining the groups of subcarriers for transmission comprises:
    determining, based on the characterized downlink channel and the available output power of the transceiver antennas, groups of subcarriers for transmission that will maximize an uplink transmission quality.

4. The method of claim 1, further comprising:
    estimating an expected uplink channel quality based on the characterized downlink channel; and
    allocating the groups of subcarriers for uplink transmission based on the expected uplink channel quality.

5. The method of claim 1, wherein allocating the groups of subcarriers comprises:
    allocating the groups of subcarriers to a single transceiver antenna in the plurality of transceiver antennas.

6. The method of claim 1, wherein characterizing the downlink channel comprises:
    forming an estimate of the downlink channel using a preamble of a frame of the downlink signal.

7. The method of claim 1, wherein characterizing the downlink channel comprises:
    forming an estimate of the downlink channel using a plurality of pilots occurring after a preamble of a frame of the downlink signal.

8. The method of claim 1, wherein characterizing the downlink channel comprises:
    forming an estimate of the downlink channel based on subcarriers corresponding to the groups of subcarriers to be allocated for uplink transmission.

9. The method of claim 1, wherein characterizing the downlink channel comprises:
    characterizing the downlink channel based on a plurality of downlink signals in a plurality of frames received through the plurality of transceiver antennas.

10. A subscriber station, comprising:
    a first transceiver antenna coupled to a first power amplifier; and
    a second transceiver antenna coupled to a second power amplifier, wherein the subscriber station is configured to allocate groups of subcarriers for transmission by the first transceiver antenna and the second transceiver antenna by:
        receiving a first downlink signal through the first transceiver antenna,
        receiving a second downlink signal through the second transceiver antenna,
        characterizing, based on the first downlink signal and the second downlink signal, a downlink channel over multiple subcarriers,
        determining, based on the characterized downlink channel and available output power of the first power amplifier and the second power amplifier, groups of subcarriers for transmission, and
        allocating the groups of subcarriers for uplink transmission by the first transceiver antenna and the second transceiver antenna.

11. The subscriber station of claim 10, wherein the subscriber station is configured to characterize the downlink channel based on determining a relative signal power difference between multiple subcarrier signals in the downlink signal, and wherein the subscriber station is configured to allocate the groups of subcarriers based on the relative signal power difference.

12. The subscriber station of claim 10, wherein the subscriber station is configured to characterize the downlink channel by forming an estimate of the downlink channel using a preamble of a frame of the downlink signal.

13. The subscriber station of claim 10, wherein the subscriber station is configured to characterize the downlink channel by forming an estimate of the downlink channel using a plurality of pilots occurring after a preamble of a frame of the downlink signal.

14. The subscriber station of claim 10, wherein the subscriber station is configured to characterize the downlink channel based on a plurality of downlink signals in a plurality of frames received through the first transceiver antenna and the second transceiver antenna.

15. The subscriber station of claim 10, wherein the subscriber station is further configured to allocate the groups of subcarriers for uplink transmission by:
    performing an initial allocation of the groups of subcarriers for uplink transmission through the first transceiver antenna and second transceiver antenna based on channel quality metrics of the characterized downlink channel; and
    modifying the initial allocation of the groups of subcarriers based on transmit power constraints of the first power amplifier and the second power amplifier.

16. A method of allocating and transmitting groups of subcarriers between a plurality of transceiver antennas, the method comprising:
    receiving a downlink signal through the plurality of transceiver antennas;
    characterizing, based on the downlink signal, a downlink channel over multiple subcarriers;
    performing an initial allocation of groups of subcarriers for uplink transmission through the plurality of transceiver antennas based on channel quality metrics of the characterized downlink channel; and
    modifying the initial allocation of the groups of subcarriers based on transmit power constraints of the transceiver antennas.

17. The method of claim 16, wherein performing the initial allocation comprises:
    performing the initial allocation of the groups of subcarriers based on a sorted difference vector of downlink channel quality metrics from the plurality of transceiver antennas.

18. The method of claim 16, wherein characterizing the downlink channel comprises characterizing the downlink channel based on a received signal power of the downlink signal, and wherein performing the initial allocation of the groups of subcarriers comprises performing the initial allocation of the groups of subcarriers based on the received signal power.

19. The method of claim 16, wherein characterizing the downlink channel comprises:
   forming an estimate of the downlink channel using a preamble of a frame of the downlink signal.

20. The method of claim 1, wherein characterizing the downlink channel comprises:
   forming an estimate of the downlink channel using a plurality of pilots occurring after a preamble of a frame of the downlink signal.

21. The method of claim 1, wherein characterizing the downlink channel comprises:
   characterizing the downlink channel based on a plurality of downlink signals in a plurality of frames received through the plurality of transceiver antennas.

\* \* \* \* \*